United States Patent
Ma et al.

(10) Patent No.: US 10,775,875 B2
(45) Date of Patent: Sep. 15, 2020

(54) DEVICES AND METHODS FOR SWITCHING AND COMMUNICATION AMONG MULTIPLE OPERATING SYSTEMS AND APPLICATION MANAGEMENT METHODS THEREOF

(71) Applicant: MediaTek Singapore Pte. Ltd., Singapore (SG)

(72) Inventors: Liming Ma, Sichuan (CN); Zhiwei Yang, Hebei (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 349 days.

(21) Appl. No.: 15/856,364

(22) Filed: Dec. 28, 2017

(65) Prior Publication Data

US 2018/0120927 A1 May 3, 2018

Related U.S. Application Data

(63) Continuation-in-part of application No. 14/736,724, filed on Jun. 11, 2015, now Pat. No. 9,894,605.

(30) Foreign Application Priority Data

Jun. 11, 2014 (CN) .......................... 2014 1 0258393
Jun. 8, 2015 (CN) .......................... 2015 1 0309618

(51) Int. Cl.
| | |
|---|---|
| *H04W 52/02* | (2009.01) |
| *G06F 1/3296* | (2019.01) |
| *G06F 9/4401* | (2018.01) |
| *G06F 3/06* | (2006.01) |
| *G06F 1/3287* | (2019.01) |

(Continued)

(52) U.S. Cl.
CPC .......... *G06F 1/3296* (2013.01); *G06F 1/3206* (2013.01); *G06F 1/3287* (2013.01); *G06F 3/0604* (2013.01); *G06F 3/0632* (2013.01); *G06F 3/0647* (2013.01); *G06F 3/0685* (2013.01); *G06F 9/441* (2013.01); *G06F 9/4403* (2013.01); *G06F 9/4418* (2013.01); *G06F 1/3275* (2013.01); *Y02D 10/44* (2018.01)

(58) Field of Classification Search
CPC .... G06F 1/3296; G06F 1/3206; G06F 1/3287; G06F 3/0604
USPC ........................................................ 713/320
See application file for complete search history.

(56) References Cited

U.S. PATENT DOCUMENTS

2004/0168095 A1* 8/2004 Yeh ........................ G06F 1/3203
  713/300
2007/0078891 A1* 4/2007 Lescouet ............... G06F 9/4881

(Continued)

FOREIGN PATENT DOCUMENTS

| CN | 103476002 A | 12/2013 |
|---|---|---|
| CN | 103778022 A | 5/2014 |

*Primary Examiner* — Robert A Cassity
(74) *Attorney, Agent, or Firm* — McClure, Qualey & Rodack, LLP

(57) ABSTRACT

A device includes a storage unit and a processing unit. The processing unit includes a processor and is coupled to the storage unit. The processing unit operates a big operating system (BOS) and a little operating system (LOS) and can dynamically switch between the BOS and the LOS according to the system loading status of the device, wherein power consumption and resource requirements of the BOS are different than those of the LOS.

23 Claims, 8 Drawing Sheets

(51) Int. Cl.
*G06F 1/3206* (2019.01)
*G06F 1/3234* (2019.01)

(56) References Cited

U.S. PATENT DOCUMENTS

| | | | | |
|---|---|---|---|---|
| 2008/0010473 | A1* | 1/2008 | Harris | G06F 1/3203 |
| | | | | 713/300 |
| 2008/0155542 | A1* | 6/2008 | Maigne | G06F 9/4843 |
| | | | | 718/100 |
| 2008/0244289 | A1* | 10/2008 | LeProwse | G06F 9/441 |
| | | | | 713/320 |
| 2010/0106952 | A1 | 4/2010 | Kawano | |
| 2013/0060815 | A1* | 3/2013 | Saeki | G06F 16/27 |
| | | | | 707/802 |
| 2013/0080816 | A1* | 3/2013 | Johnson | G06F 1/3206 |
| | | | | 713/401 |
| 2013/0151840 | A1* | 6/2013 | Kanigicherla | G06F 9/461 |
| | | | | 713/100 |
| 2013/0326253 | A1 | 12/2013 | Lam | |
| 2013/0339941 | A1 | 12/2013 | Shelton | |
| 2015/0065110 | A1* | 3/2015 | Nakao | H04W 52/0254 |
| | | | | 455/418 |
| 2015/0100890 | A1 | 4/2015 | Kosmiskas et al. | |
| 2015/0277401 | A1* | 10/2015 | Hsiao | G05B 15/02 |
| | | | | 700/40 |

\* cited by examiner

DEVICES AND METHODS FOR SWITCHING AND COMMUNICATION AMONG MULTIPLE OPERATING SYSTEMS AND APPLICATION MANAGEMENT METHODS THEREOF

CROSS REFERENCE TO RELATED APPLICATIONS

This application is a Continuation-In-Part of U.S. patent application Ser. No. 14/736,724, filed on Jun. 11, 2015, now U.S. Pat. No. 9,894,605, which claims priority of China Patent Application No. No. 201410258393.6, filed on Jun. 11, 2014, and China Patent Application No. 201510309618.0, filed on Jun. 8, 2015, the entireties of which are incorporated by reference herein.

BACKGROUND OF THE INVENTION

Field of the Invention

The disclosure relates generally to mobile communications and, more particularly, to devices and methods for switching and communication among multiple operating systems and application management methods thereof.

Description of the Related Art

As mobile communication technology has developed, applications for devices (e.g., wearable devices, embedded devices, IoT devices, etc.) have become more and more popular. Devices can perform functions such as intelligent display, receiving and sending e-mail, receiving and sending messages, body monitoring, and so on. A device often has the advantages of having a small size, a small battery, and low hardware cost. The device, however, requires high endurance, and thus saving power becomes very important.

Typically, a device may have the following features: better interface operational performance required during user operation, non-scheduled sensor monitor and time display when idle, and ultra-long standby.

However, the devices that are currently available fail to resolve technical problems related to saving power. Therefore, there is a need for devices and methods capable of simply achieving the goal of ensuring ultra-long standby of devices.

BRIEF SUMMARY OF THE INVENTION

Devices and methods for switching and communication among multiple operating systems and application management methods thereof are provided.

In an embodiment, a device with a storage unit and a processing unit is provided. The processing unit includes a processor and is coupled to the storage unit. The processing unit operates a big operating system (BOS) and a little operating system (LOS) and can dynamically switch between the BOS and the LOS according to the system loading status of the device, wherein power consumption and resource requirements of the BOS are different than those of the LOS.

In another embodiment, a method for switching between multiple operating systems in a device is provided, wherein the device is operable in a big operating system (BOS) and a little operating system (LOS) and power consumption and resource requirements of the BOS are different than those of the LOS. The method for switching between multiple operating systems in the device includes the steps of: detecting system loading status of the device and dynamically switching between the BOS and the LOS according to the detected system loading status of the device.

In another embodiment, a communication method for communication between multiple operating systems in a device is provided, wherein the device is operable in a big operating system (BOS) and a little operating system (LOS) and the BOS is operable in a normal mode and the LOS is operable in a suspend mode, a hibernation mode or a deep hibernation mode. The communication method for communication between multiple operating systems in the device includes the steps of: transferring a shared memory area from a random access memory (RAM) to a tightly coupled memory (TCM) before the operation of the device is switched from the normal mode the BOS to the suspend mode, the hibernation mode or the deep hibernation mode of the LOS; and transferring the shared memory area from the TCM to the RAM when the operation of the device is switched from the suspend mode, the hibernation mode or the deep hibernation mode of the LOS to the normal mode of the BOS.

In another embodiment, an application management method applied to a device is provided, wherein the device is operable in at least one big operating system (BOS) and one little operating system (LOS) and is applicable to perform a plurality of applications. The application management method applied to the device includes the steps of: dividing the plurality of applications into applications operating on the BOS and applications operating on the LOS; and respectively performing the applications operating on the BOS and the applications operating on the LOS in the BOS and the LOS, wherein the applications operating on the BOS and the applications operating on the LOS are different.

Other aspects and features of the present invention will become apparent to those with ordinary skill in the art upon review of the following descriptions of specific embodiments of the lower-power devices and systems for carrying out the methods for switching and communication among multiple operating systems and application management methods thereof.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
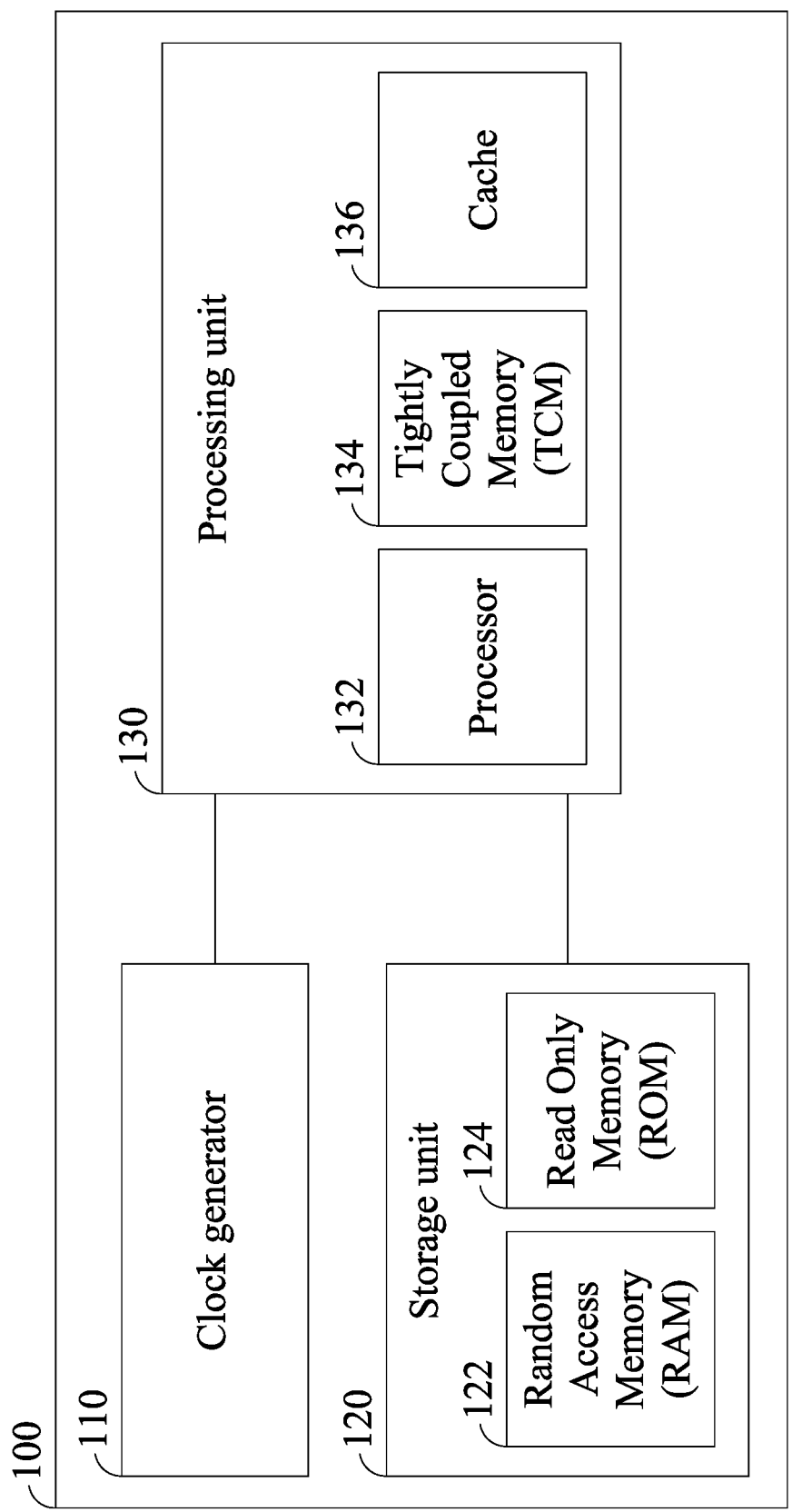
FIG. 1 is a schematic diagram illustrating the system hardware configuration of a device according to an embodiment of the invention.

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

It should be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numbers and/or letters in the various examples. This repetition is for the purpose of simplicity and clarity and does not in itself dictate a relationship between the various embodiments and/or configurations discussed. Furthermore, the formation of a first feature over or on a second feature in the description that follows may include embodiments in which the first and second features are formed in direct contact, and may also include embodiments in which additional features may be formed between the first and second features, such that the first and second features may not be in direct contact.

Embedded Operating System (EOS) refers to an operating system used in embedded systems. The EOS has the advantages of, for example, a small internal system core, high-specificity, a streamlined system, high real-time, multi-tasking, and so on. However, with the growing development of consumer electronic products, and due to the higher functional requirements, users' operability has also grown. This means the operating system needs to manage more and more hardware resources and system resources, and there is more task scheduling that demands CPU of the equipment to operate on higher frequencies, such as 260 MHz per second. At the same time, there is also a higher need for code spaces, thereby leading to increased power consumption of devices. The EOS may comprise, for example, Android, Nucleus, WinCE and so on.

Due to the need to control more system resources and hardware resources as mentioned above, on one hand, when the system loading is smaller, e.g., when the user needs fewer functions, the device may still need to operate at a higher operating voltage to continue operation of the huge operating system. On the other hand, when the system loading is smaller, the power supply for loading the system with unnecessary hardware modules (such as memory, bus, etc.) is also an enormous waste of resources. In fact, as the devices are performing date display and sensor detection only most of time, when operating on bigger operating systems, unnecessary power consumption by the devices will inevitably result. Hence, the present invention provides devices and methods capable of simply achieving the goal of ensuring an ultra-long standby of the devices. By setting up two or more operating Systems (OS) on a single hardware device and setting up dynamic switching between OSs, the purpose of saving power can be achieved.

FIG. 1 is a schematic diagram illustrating the system hardware configuration of a device 100 according to an embodiment of the invention. The device 100 may comprise a clock generator 110, a storage unit 120 and a processing unit 130. The processing unit 130 may further include a processor 132, a Tightly Coupled Memory (TCM) 134 and a cache 136. In addition, the storage unit 120 may include a random access memory (RAM) 122 and a read only memory (ROM) 124. The processing unit 130 which is coupled to the storage unit 120 can be used to operate multiple operating systems (OSs) and can dynamically switch between the OSs with different power consumption and resource requirements according to the system loading status of the device 100. Noted that, the device 100 may be an electronic device, such as a low-power device, an embedded device, a wearable device or an IoT device, etc. and the invention is not limited thereto.

Figure 2:
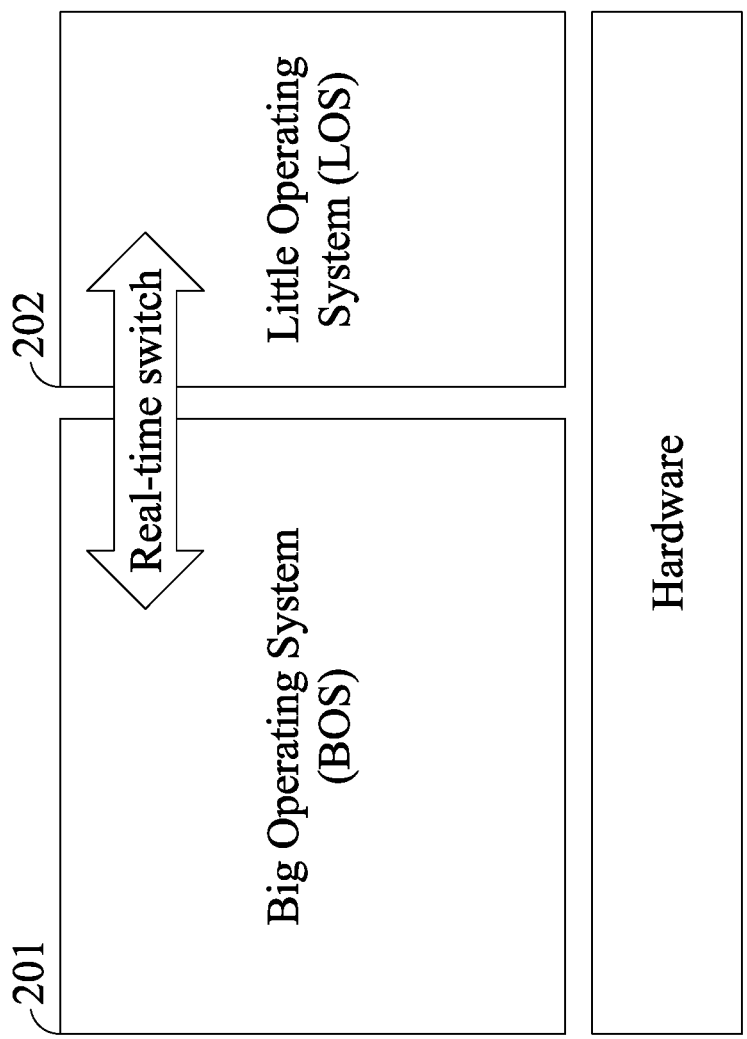
FIG. 2 is a schematic diagram illustrating a device with dual operating systems according to an embodiment of the invention.

FIG. 2 is a schematic diagram illustrating a device with dual operating systems according to an embodiment of the invention. As shown in FIG. 2, the device 100 (hereinafter abbreviated as the device 100) may have a Big Operating System (hereinafter referred to as BOS) 201 and a Little Operating System (hereinafter referred to as LOS) 202. Different OSs may have different requirements for storage space, power consumption, frequency, etc. Although the LOS is functionally simple and processes simple tasks, it has a small code size and a small demand for storage space resources. The BOS has powerful functions and processes complex tasks, but it has a big code space and a great demand for storage space resources. When switching from the BOS to the LOS, power for unused hardware resources will be cut off, or the device will be in the standby mode to achieve the purpose of saving power. When the system loading is small, the device 100 loads the LOS 202 for operation. The LOS 202 possesses features such as a small system core, high specificity, a streamlined system, high real-time, the ability to multitask, etc., so that it is able to implement specific functions, such as to display the time on the device 100 and perform pedometer sensor detection, under lower work voltages and lower work frequencies (such as 26 MHz per second or 32 KHz per second). It should be understood that the dual OSs as shown in FIG. 2 are merely examples and are not intended to be limiting. Persons skilled in the art will understand that the above-described device can be applied to more than two OSs without departing from the scope and spirit of this invention, and the invention is not limited thereto.

The above-mentioned dual OSs architecture features the following: the hardware resources occupied by the LOS 202 are part of those occupied by the BOS 201; the LOS 202 and the BOS 201 may share hardware resources (such as CPU, bus, etc.) and one of the hardware resources can be used by only one of the OSs at a time; they cannot be operated at the same time in which only one OS will be operated at one time; and the BOS 201 is operated when the system loading is heavy while the LOS 202 is operated when the system loading is light.

In addition, in this embodiment, four different operation modes are further provided to the BOS 201 and the LOS 202, including a normal mode, a suspend mode, a hibernation mode, and a deep hibernation mode. Power saving can be achieved by controlling the different operation modes under different OS. The BOS can be operated in normal mode and the LOS can be operated in the suspend mode, the hibernation mode, and the deep hibernation mode, wherein the normal mode belongs to a non-power-saving mode and the suspend mode, the hibernation mode, and the deep hibernation mode belong to three different power-saving modes.

Figure 3:
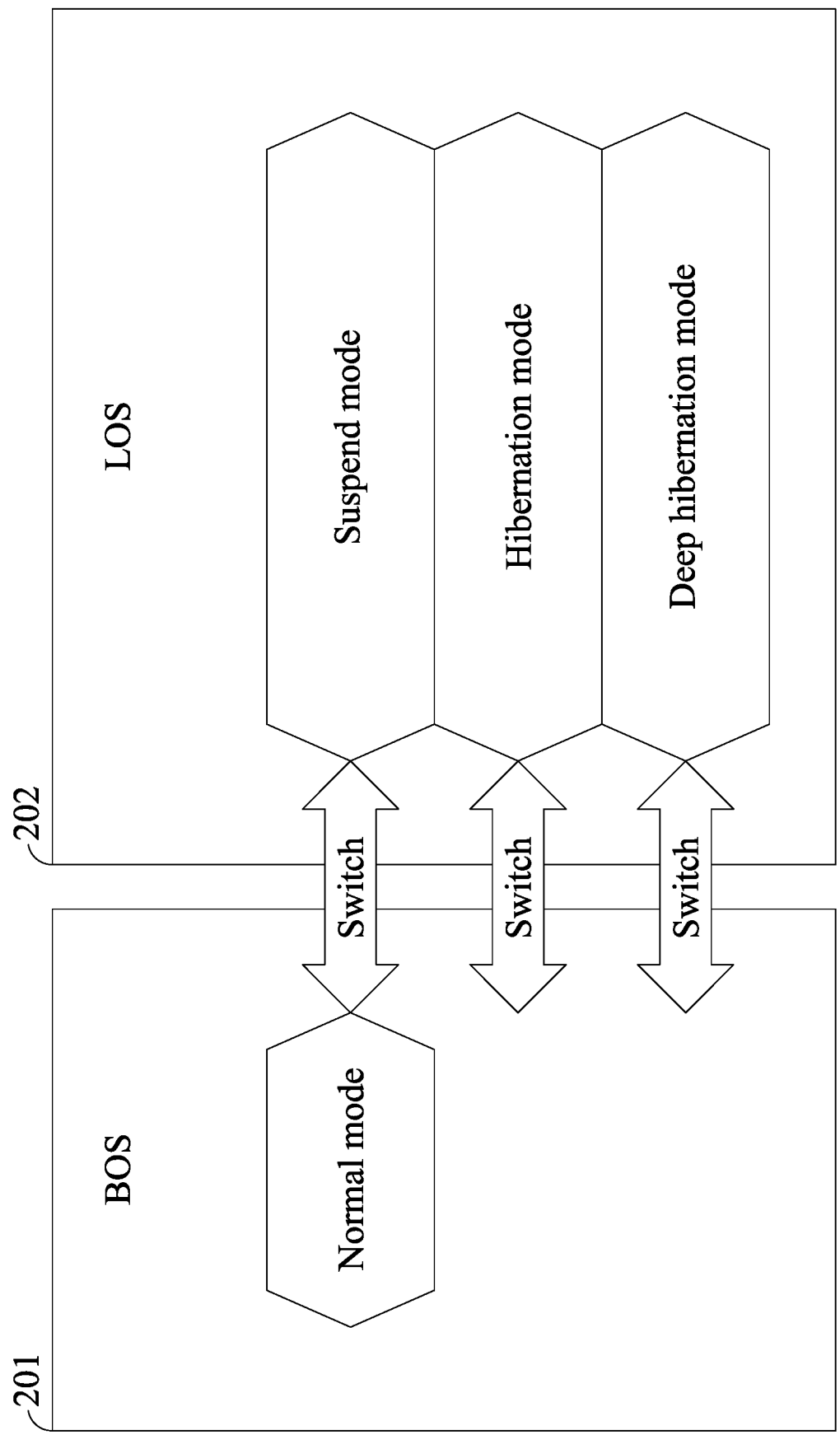
FIG. 3 is a schematic diagram illustrating a dual operating system having multiple modes according to an embodiment of the invention.

FIG. 3 is a schematic diagram illustrating the dual OSs having multiple modes according to an embodiment of the invention. As shown in FIG. 3, the above-mentioned system can be divided into four operation modes, namely, the normal mode, the suspend mode, the hibernation mode, and the deep hibernation mode. The normal mode is a non-power-saving mode of the device, and the suspend mode, the hibernation mode, and the deep hibernation mode are three power-saving modes, in turn strengthening the degree to which power is saved. In the embodiments of the invention, the suspend mode, the hibernation mode, and the deep hibernation mode are operated under the LOS. For example, in the normal mode, the device may operate a variety of applications, such as a touch screen operation, a music player, Bluetooth transmission, and other heavy-loading applications, but the power consumption is also large. Three different power-saving modes may achieve varying degrees of power saving by turning off unnecessary or unused hardware resources, such as in the suspend mode and the hibernation mode; both of which are power-saving modes that may have only a little memory for use (such as 89K bytes) so that only some of the more simple functions can be performed, such as updating the time, collecting sensor data, or performing a simple sensor-algorithm calculation. In the deep hibernation mode, the device can be turned off and the clock generator 110 can further be applied to boot up regularly to periodically update the time or detect sensor readings.

Specifically, in the normal mode, as shown in FIG. 1, the cache 136, the TCM 134, and the storage unit 120 are powered and in an accessible state, and thus the CPU of the processor 132 is at the highest frequency (e.g., 260 MHz per second) and at the maximum operating voltage (e.g., 1.8V) at the same time. When the device 100 operates under the suspend mode of the LOS, i.e., the OS is in the suspend mode, for the storage unit 120 shown in FIG. 1, the RAM is supplied with power while the power of the ROM is turned off, so that the RAM is in a power-on state and the ROM is in a power-off state. Because the RAM is in the power-on state, users do not need to access it, and therefore power consumption is lower and data in the RAM can be maintained. With the power supply selection of the RAM and the ROM mentioned above, memory power consumption for the device 100 in the suspend mode can be reduced. In the suspend mode, as the loading demand is small, not only can the frequency of the processor 132 be significantly reduced, such as reducing it to 26 MHz per second or 32 KHz per second, but also the working voltage of the OS can be significantly reduced, such as reducing it to 1.1V or less than 1.1V. By saving power on the memory and the reduced working voltage, it may be guaranteed that the power consumption in the suspend mode is about 10% of that in the normal mode, or even lower. In the suspend mode, the OS may perform simple calculations, update time or sensor detection and other simple operations.

When the device 100 operates under the hibernation mode of the LOS, that is, when the OS is under the hibernation mode, for the storage unit 120 shown in FIG. 1, the powers of the ROM and the RAM are both being turned off so that the RAM and the ROM are in a power-off state. Since the RAM is powered off, the data in RAM may not be maintained, but power consumption required for the RAM standby can be saved. Similarly, in the hibernation mode, the frequency and the operating voltage of the processor 132 can also be greatly reduced. In the hibernation mode, the OS may perform simple calculation, update time or sensor detection and other simple operations and the power consumption of the device in the hibernation mode may only be 50% of the power consumption in the suspend mode, or even lower.

When the device 100 operates in the deep hibernation mode of the LOS, that is, when the OS is in the deep hibernation mode and when the loading of the device is extremely light (e.g. only time update is required), the entire device 100 will be shut down. In addition to maintaining the necessary hardware power consumption for displaying the time, most of the hardware devices will not draw power. By doing so, the power consumption of the device in the deep hibernation mode may only use 20% of the power consumption in the hibernation mode or even lower.

Figure 4:
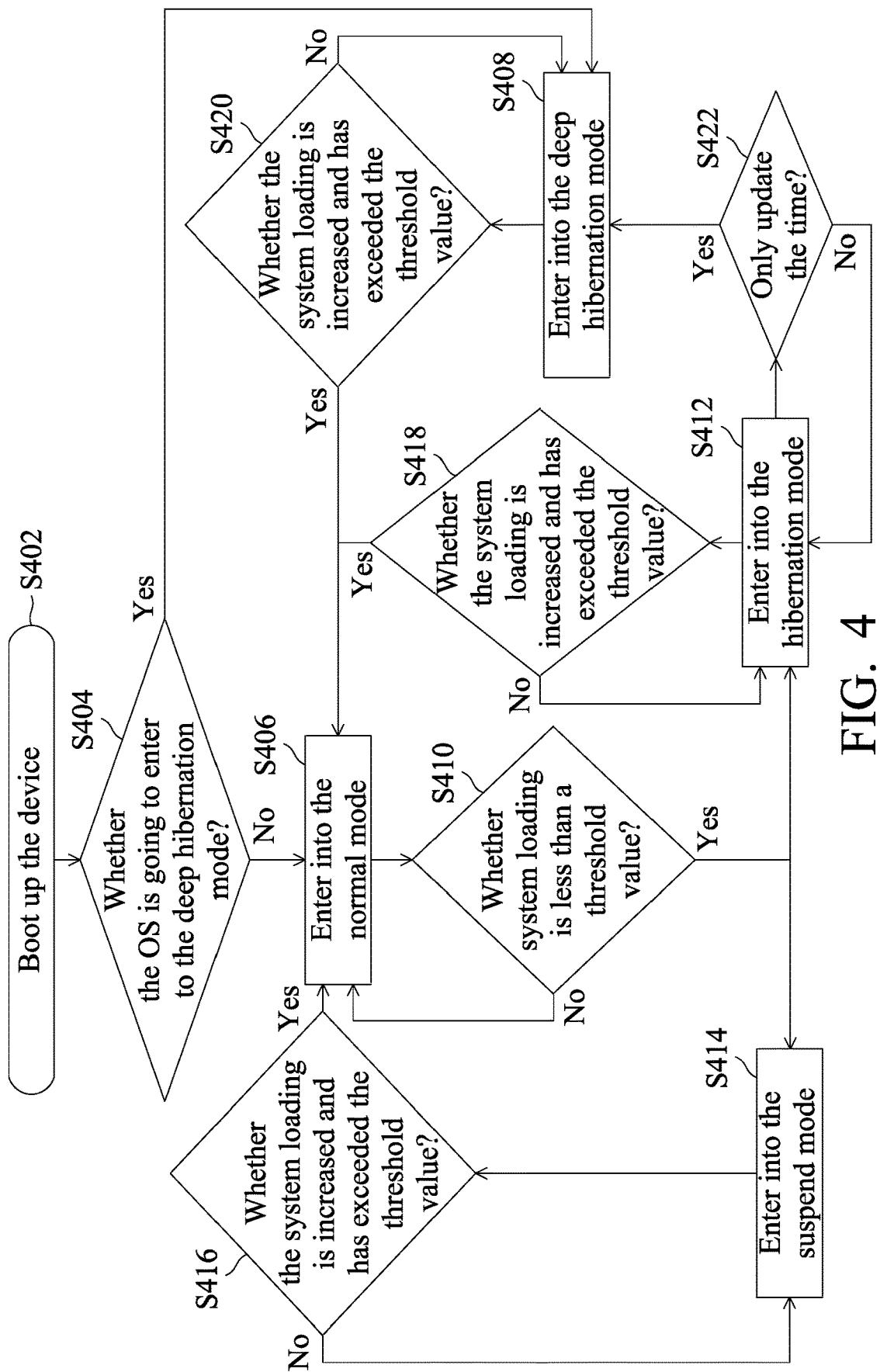
FIG. 4 is a flowchart of a method for switching between different modes according to an embodiment of the invention.

FIG. 4 is a flowchart of a method for switching between different modes according to an embodiment of the invention. The flowchart of the method for switching between the different modes can be applied to a device, such as the device 100 as shown in FIG. 1 and can be performed by the processor 132 of the processing unit 130 that loads and executes a series of instructions and/or program codes from the storage unit 120 to control the operation of related hardware components, for switching the mode of the OS of the invention. The method for switching between different modes of the device includes the following steps.

First, in step S402, the device is booted. Next, in step S404, the processor of the device determines whether the OS is going to enter to the deep hibernation mode. If the user has pressed the power button to turn the device on for this booting, in step S406, the processor configures the OS to enter to the normal mode through the above determination, and the entire system loads the BOS for operation. If the booting is caused by the real time clock generated by the above-mentioned clock generator to boot up regularly to periodically update the time, in step S408, the processor loads the LOS for operation, and directly enters the deep hibernation mode. After the OS is in the normal mode, in step S410, the processor further determines whether the system loading is less than a threshold value. If the system loading is determined as less than the threshold value, such as when only a sensor detection or a time updating function is required to be performed, in step S412, the OS is configured to load the LOS and the LOS further enters into the hibernation mode. In the other hand, in step S414, the OS is configured to load the LOS and the LOS further enters into the suspend mode. If the result of the determination in step S410 is determined as the system loading is not less than the threshold value, the method returns to step S406 to configure the OS to maintain the BOS and the BOS further enters into the normal mode. In steps S416, S418 and S420, the processor determines whether the system loading is increased and has exceeded the threshold value, and if the answer is positive, the system enters the BOS and the BOS operates in the normal mode; otherwise, the system continues to remain in the LOS and operate in the suspend mode, the hibernation mode, or the deep hibernation mode. After the system enters into the hibernation mode, in step S422, the processor further determines whether the device provides only a time-updating function. If the answer is positive, the system changes its mode from the hibernation mode to the deep hibernation mode; otherwise, the system continues to remain in the hibernation mode.

It should be noted that the processor may further determine whether the system loading has changed based on a determination of whether there is any application (APP) on the device which operation is being locked in the suspend mode or the hibernation mode. Specifically, in the hibernation mode, if the system only needs to update the time on the device, or it just needs to regularly detect the sensors, it can enter into the deep hibernation mode.

On the other hand, in the suspend mode, hibernation mode, or deep hibernation mode, if the processor detects that the system loading of the devices is increased to exceed a threshold value or it receives a user input, such as the user operating the device, or a Bluetooth pairing, or a Bluetooth message-pushing was performed, the processor may choose to switch from the current mode back to the normal mode of the BOS to continue the operation.

Another embodiment of the present invention may further provide a specific switching process between the BOS and the LOS. Specifically, in some embodiments, image files of the BOS and the LOS can first be set on the ROM (e.g., ROM can be eXecute In Place (XIP), such as NOR FLASH, or NAND FLASH). Therefore, the ROM may contain a first image file corresponding to the BOS and a second image file corresponding to the LOS, in which the processor can load the first image file or the second image file into the RAM to dynamically switch between the BOS and the LOS, respectively.

In the normal mode, the RAM, the TCM, the ROM and the cache are used. To save time needed for mode switching, in the normal mode, the processor may first copy the image file of the LOS in the ROM into an unused area on the RAM, this is because accessing the ROM may take place at a slow speed, take a long time, and incur a large power consumption. Therefore, the image file of the LOS is copied to the RAM during initialization of the normal mode so that when the LOS is being loaded during the mode switching, the image file of the LOS can be loaded directly from the RAM so as to save power and shorten the time required for the mode switching.

In one embodiment, the aforementioned dynamic switching between the BOS and the LOS may comprise the step of switching from the normal mode of the BOS to the suspend mode of the LOS to continue the operation. The operation process in which the OS is switched from the normal mode to the suspended mode may include the following steps: running the BOS; backing-up data in the TCM to an unused area in the RAM; decreasing the phase-locked loop (PLL) frequency of the processor of the device (e.g., from 260 MHz per second down to 26 MHz per second); decreasing the operation voltage for the processor of the device (e.g., from 1.3V down to 1.1V); loading the image file of the LOS to the TCM; turning off the power of unused hardware devices (e.g., the ROM, etc.); and switching to the suspend mode and operating in the suspend mode.

In another embodiment, the aforementioned dynamic switching between the BOS and the LOS may comprise the step of switching from the suspend mode of the LOS to the normal mode of the BOS to continue the operation. If the OS is switched from the suspend mode back to the normal mode, as the RAM is in the power-on state in the suspend mode, the work field for the system under the previous normal mode can be restored, and thus it can quickly switch back to the normal mode and can revert to the time point at which it previously exited the normal mode to continue the operation. In one embodiment, the operation process in which the OS is switched from the suspended mode to the normal mode may include the following steps: running the LOS; increasing the operation voltage for the processor of the device (e.g., from 1.1V to 1.3V); increasing the PLL frequency of the processor of the device (e.g., from 26 MHz per second up to 260 MHz per second); activating and initializing hardware devices that have previously been turned off; restoring the TCM data backed-up in the RAM to the TCM; and switching to the normal mode and operating in the normal mode.

If the OS is switched from the normal mode to the hibernation mode, two specific embodiments are provided for practice in the present invention. One embodiment is to decrease the PLL frequency of the processor of the device (e.g., from 260 MHz per second down to 26 MHz per second), decrease the operation voltage for the processor of the device (e.g., from 1.3V down to 1.1V), load the image file of the LOS to the TCM, turn off the power of unused hardware devices (e.g., the ROM, the RAM, etc.) and switch to the hibernation mode and operate in the hibernation mode. Another embodiment is to backup memory data being used under the normal mode in the TCM and the RAM to an unused area in the ROM, decrease the PLL frequency of the processor of the device (e.g., from 260 MHz per second down to 26 MHz per second), decrease the operation voltage for the processor of the device (e.g., from 1.3V down to 1.1V), load the image file of the LOS to the TCM, turn off the power of unused hardware devices (e.g., the ROM, the RAM, etc.) and switch to the hibernation mode and operate in the hibernation mode.

In addition, if the OS of the system is switched from the hibernation mode to the normal mode, as in the hibernation mode, the power of the RAM will be turned off, so the data inside the RAM cannot be saved. If the first embodiment described above is used, the RAM data and the TCM data in the normal mode have been lost and thus in order to switch back to the normal mode, the BOS needs to be reloaded to restart the normal mode of operation. Two specific embodiments are provided for practice in the present invention. One embodiment is: increasing the operation voltage for the processor of the device (e.g., from 1.1V to 1.3V); increasing the PLL frequency of the processor of the device (e.g., from 26 MHz per second to 260 MHz per second); activating and initializing hardware devices that have previously been turned off; loading the BOS to restart the normal mode.

Another embodiment is: increasing the operation voltage for the processor of the device (e.g., from 1.1V to 1.3V); increasing the PLL frequency of the processor of the device (e.g., from 26 MHz per second to 260 MHz per second); activating and initializing hardware devices that have previously been turned off; restoring the TCM data and the RAM data backed-up in the ROM to the TCM and the RAM, respectively; and switching to the normal mode and operating in the normal mode.

According to the embodiment of the invention, in the deep hibernation mode, the device may only regularly update the time or regularly detect the sensor, such as when completing a regular wake-up or sensor detection, the system may directly load the LOS and operate in the deep hibernation mode. After completing the time update or sensor detection, the system may then shut down the entire device until the next regular wake-up. In addition, when the system is in the deep hibernation mode, if the user wishes to operate the device, through user input operations such as pressing a key on the keypad, the system may return to the normal mode. The method for switching back from the deep hibernation mode to the normal mode is the same as switching back from the hibernation mode to the normal mode.

Another embodiment of the present invention provides a communication mechanism between the BOS and the LOS. It should be noted that, in the present invention, the BOS and the LOS can be simultaneously compiled or they can be compiled separately. This embodiment uses a situation in which the BOS and the LOS are compiled separately as an example, and therefore the BOS and APPs under the BOS generate an image file while the LOS and APPs under the LOS generate another image file. Since both OSs need to perform the same function on the devices (such as a time update, sensor detection, calculations, and so on), there must be a communication problem between the two systems, such as requesting to send data sampled by the sensor under the LOS (operating in the suspend mode or in the hibernate mode) to the BOS (operating in the normal mode) for processing.

In the embodiments of the invention, two communication mechanisms are implemented: a static communication mechanism (Static Cross System Communication interface) and a dynamic communication mechanism (dynamic Cross System Communication interface). Hereinafter, the static communication mechanism is also referred to as SCSCI and the dynamic communication mechanism is also referred to as DCSCI. Intrinsically, SCSCI and DCSCI need to move data from the BOS (operating in the normal mode) to the LOS (operating in the suspend or hibernation mode) or reverse transfer. In the embodiments of the invention, implementations of SCSCI and DCSCI require the use of a shared memory.

In the BOS and LOS, the shared memory address can be the same or it can be different. In the present embodiment of the invention, the shared memory in the LOS and BOS are memories not using a memory address, as shown in FIG. 5.

Figure 5:
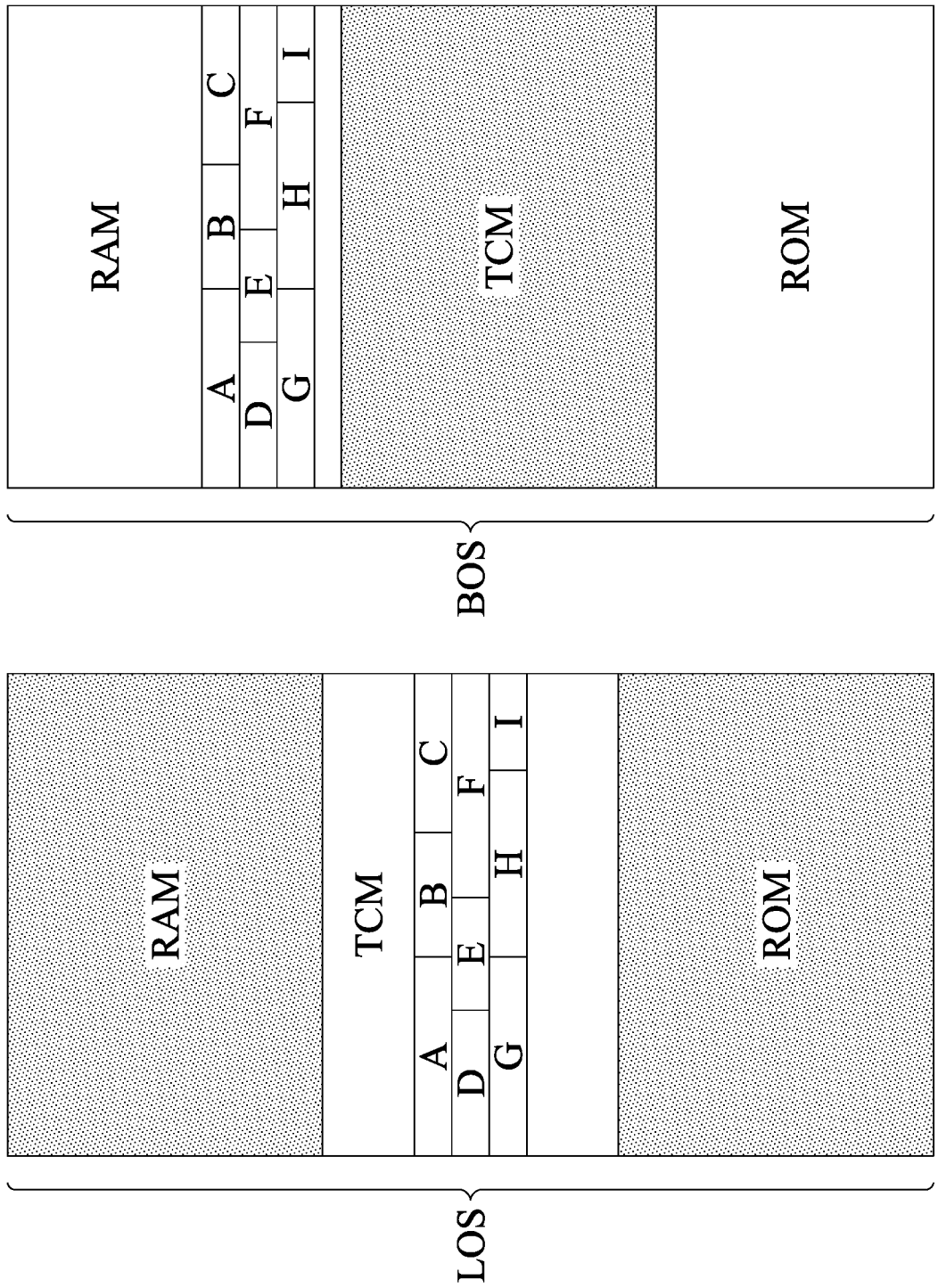
FIG. 5 is a schematic diagram illustrating a memory used for communication according to an embodiment of the invention.

FIG. 5 is a schematic diagram illustrating a memory used for communication according to an embodiment of the invention. The shared memory is located in the TCM under the LOS while the shared memory is located in the RAM under the BOS. The shared memory may be referred to a CSCI area. In the embodiment of the invention, as the CSCI areas are not located in the same address, the CSCI area need to be transferred during the mode switching (dual system switching). For example, the CSCI area needs to be moved from the RAM to the TCM before the operation is switched from operating in the BOS (operating in the normal mode) to operating in the LOS (operating in the suspend mode or the hibernation mode). Similarly, the CSCI area needs to be transferred from the TCM to the RAM when the operation is switched from operating in the LOS (operating in the suspend mode or the hibernation mode) to operating in the BOS (operating in the normal mode).

SCSCI will be described further below. Because the variables or arrays applied in the BOS and LOS need to correspond to each other, one by one, the variables or arrays must be defined with the same name in both the BOS (operating in the normal mode) and the LOS (operating in the suspend or hibernation mode). As shown in FIG. 5, variables A, B, C, . . . are placed in an order that is consistent in the BOS and LOS. For example, in one embodiment, grammar _attribute_ ((section ("csci_static _" # name), ****)) can be used to ensure consistent order of the variables.

When in use, the BOS (operating in the normal mode) and the LOS (operating in the suspend or hibernation mode) need to define a variable or array with the same name, such as, if a variable CSCI_DEFINE_ARR (char, myCSCIArr, 15) is defined under the BOS (operating in the normal mode), the LOS (operating in the suspend or hibernation mode) must define the same variable CSCI_DEFINE_ARR (char, myCSCIArr, 15). Thus, as there is the array with a name of myCSCIArr under both the BOS and the LOS, data transmission between each other can be achieved.

For DCSCI, embodiments of the invention in DCSCI implementation needs to support dynamic memory space allocation of the CSCI area under the BOS and the LOS for data transmission. The implementations above may also need to use the same identifier (ID), that is, the variable name, to achieve the allocation of a CSCI area, the release of the CSCI area and obtain the allocation of address of the CSCI area.

In the dual system switching mechanism of the invention, a timer is required for process synchronization. For example, in the normal mode, it is assumed that a timer expires in 10 seconds. If the system operation mode is switched to the suspend mode (or other modes) within 10 seconds of the timer being switched on, since the timer has not expired, the systems operation under the normal mode will be affected (when next switching back to the normal mode, but 10 seconds on the timer has already expired, without switching back to the normal mode for prompt processing). Similarly, the timer on the LOS (under the suspend mode and the hibernation mode) will also encounter the same problem.

The synchronized timer in the embodiments of the invention can resolve the above-mentioned problem. There are two types of system timer settings, the emergency timer and the non-emergency timer. The users of the timer can define their own timer type. For example, when the system is switched from the normal mode to the suspend mode, the system first searches the emergency timer about to expire under the normal mode. The expiry time of the above-mentioned timer are then recorded. When switched to the suspend mode, the above-mentioned timer will re-register in the LOS. Under the LOS, when the above-mentioned timer expires, the LOS sends out a request to switch to the normal mode. By doing so, the above-mentioned expired timer can be promptly processed.

Figure 6:
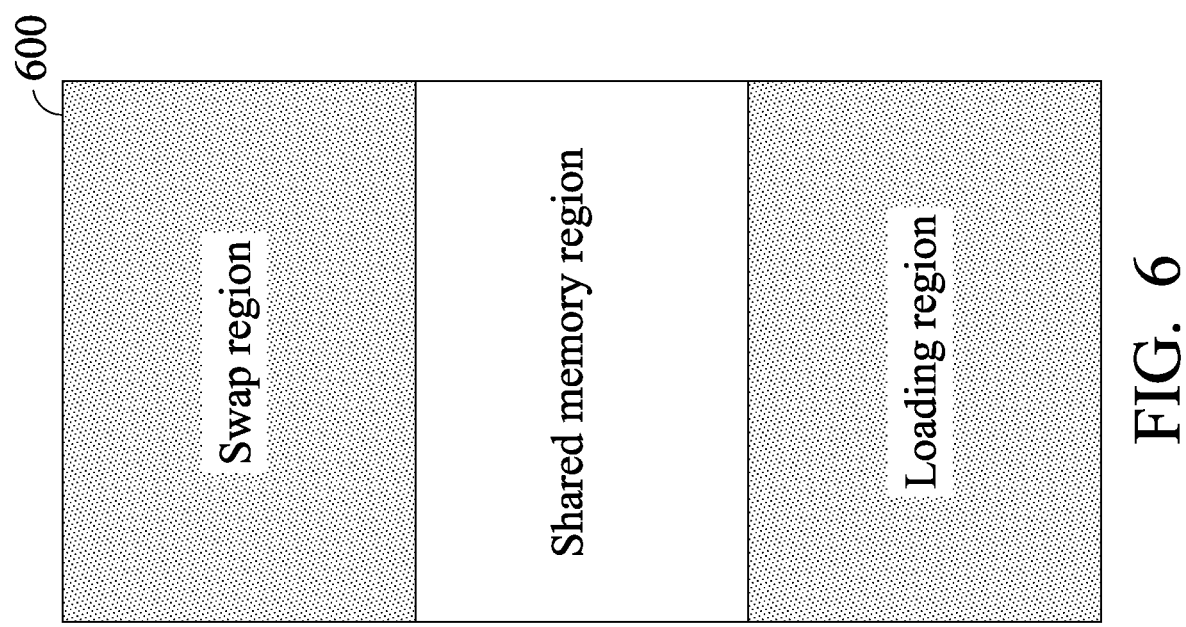
FIG. 6 is a schematic diagram illustrating a memory layout according to an embodiment of the invention.

Additionally, the present invention may further provide methods for dynamic updating and loading APP in the LOS. In the LOS, due to limited resources, the T card or phone drive may not be accessed, so the APP stored in the T card or phone drive requires loading in the BOS and completing the relocation action. The process for loading the APP of the LOS to the BOS is as follows: Read the sizes of the memory and the shared memory required for the APP loading area and apply for the necessary memory through DCSCI, as shown in FIG. 6. FIG. 6 is a schematic diagram illustrating the layout of a memory 600 according to an embodiment of the invention, wherein the memory 600 includes a swap region, a shared memory region, and a loading region. A vtp file is loaded into the loading area of the memory 600; the relocation dynamic is completed, and the list of functions available in the LOS is put into the swap region of the memory 600; LOS calls the vtp file initialization function at startup and activates the vtp file. Note that the APPs operated under the BOS are responsible for the loading and releasing of the APPs operated under the LOS, thereby more effectively controlling the LOS application lifecycle and loading and releasing at a suitable time, so as to save more power and RAM.

Another embodiment of the present invention uses the LinkIt application as an example for illustration of the embodiments of the present invention, but a person with ordinary skill in the art will understand that installation packages corresponding to other platforms may also be applied to embodiments of the invention. The LinkIt platform is a mobile application development platform similar to the JVM, Brew, which supports a dynamic link library that can smoothly run the application from the peripheral memory card. Meanwhile, LinkIt platform is formed by an abstraction layer (SAL), a Framework and LinkIt application programming interfaces (APIs), wherein the abstraction layer and the Framework form a complete operating environment, in which the Framework can be built on top of the abstraction layer, which implements LinkIt core functions, such as memory management, a dynamic link, and so on. The LinkIt application can call into the Framework APIs and LinkIt platform APIs through the LinkIt APIs, thus enabling rich functionality. In the following embodiments, the processing unit may be a LinkIt engine suitable for use in the LinkIt platform.

Figure 8:
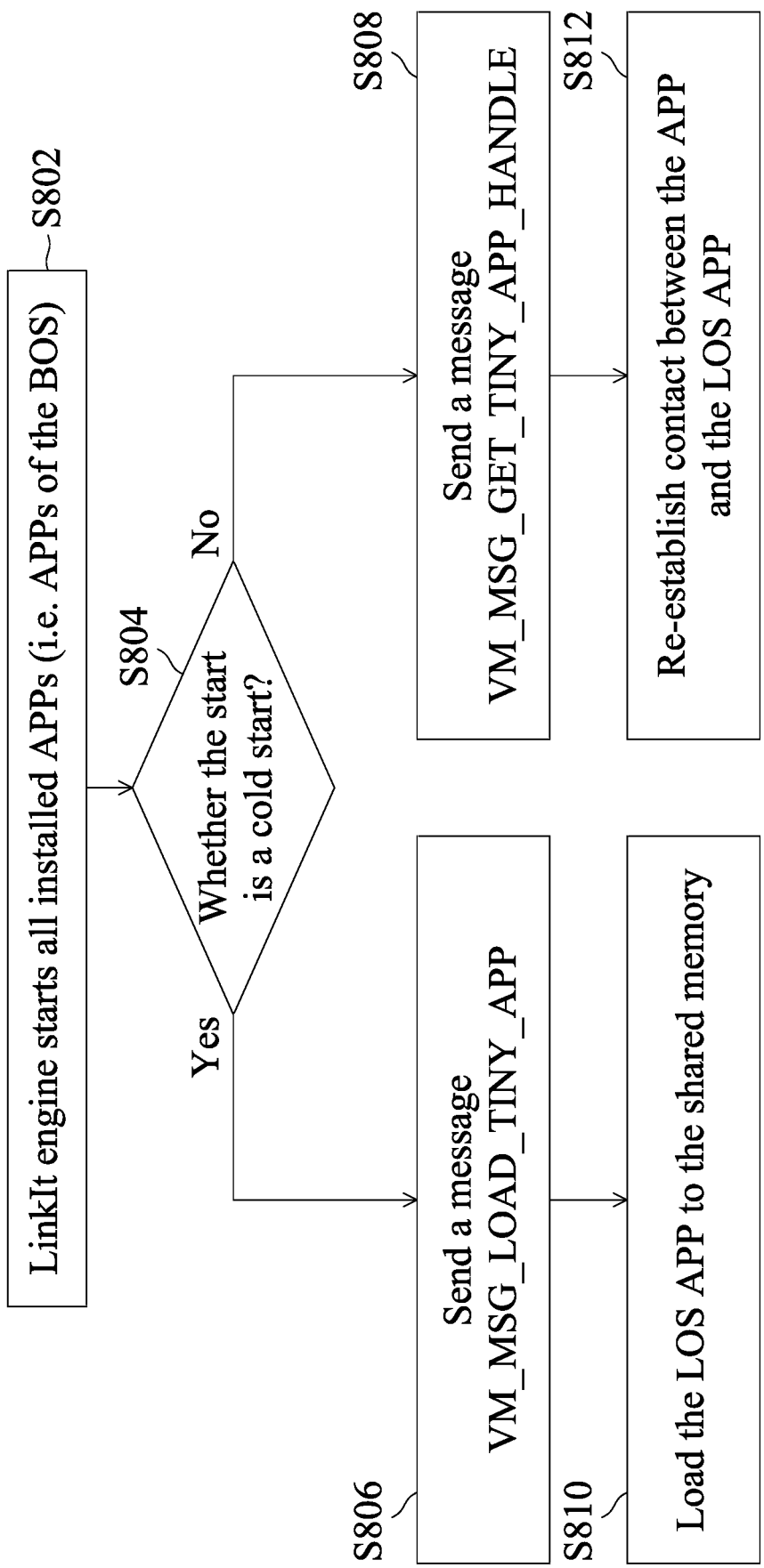
FIG. 8 is a schematic diagram illustrating a method for switching between dual OSs performed by the LinkIt engine according to an embodiment of the invention.

FIG. 8 is a schematic diagram illustrating a method for switching between dual OSs performed by the LinkIt engine according to an embodiment of the invention. In step S802, first, the LinkIt engine starts all installed APPs (i.e. APPs of the BOS), then in step S804, it determines whether the start is a cold start. If the answer is yes, then the method proceeds to step S806 in which the LinkIt engine sends a message VM_MSG_LOAD_TINY_APP to the APP. After the APP receives the message, as shown in step S810, the APP may choose to load the LOS APP to the shared memory. If the answer is no, then the method proceeds to step S808, in which the LinkIt engine sends a message VM_MSG_GET_TINY_APP_HANDLE to the APP. After receiving the message, as shown in step S812, the APP re-establishes contact between the APP and the LOS APP to re-obtain LOS APP handle.

In addition, when the OS switches back to the normal mode under the BOS from the hibernation mode, as the hibernation mode releases the RAM where the APP is located, the LinkIt engine needs to reload all installed APPs. However, because the shared memory is not released, the LOS APPs do not need to be reloaded, then the LinkIt engine sends a message VM_MSG_GET_TINY_APP_HANDLE to the APP to re-establish contact between the APP and the LOS APP. If the system switches back to the normal mode under the BOS from the suspend mode, because the RAM is not released, there is no need for the LinkIt engine to do anything, and thus the loaded APP can be operated directly by the OS scheduler operation.

Figure 7:
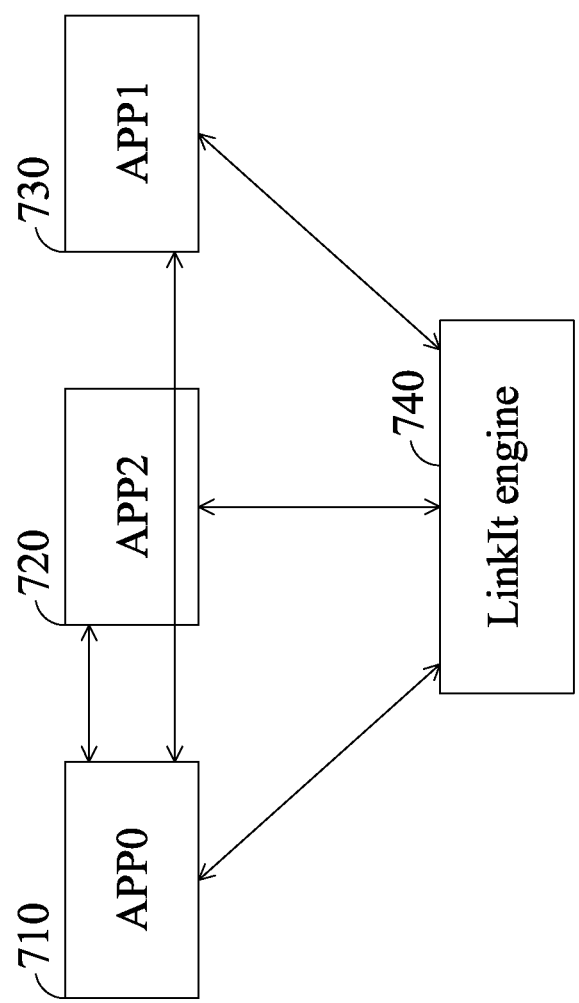
FIG. 7 is a schematic diagram illustrating an embodiment of two applications loaded in a little operating system according to the invention.

According to another embodiment of the present invention, the device can run on different APPs under different OSs in order for the LOS to save more energy and RAM. In some embodiments, all the APPs on the device are divided by OS feature into APPs operated on BOS and APPs operated on LOS, in which the BOS APP and LOS APP are operated under the BOS and LOS, respectively, thereby achieving the goal of saving power. Specifically, the APP on the BOS may have a rich interface and flexible programming (i.e. they can use almost any functional interface on the OS and there are three types of compilers to choose from, namely, ADS, RVCT, and GCC. In terms of programming, they support C and C++ languages, as well as asynchronous communication among multi-threads; the LOS only has a streamlined interface for more specificity and optimization, while limiting the compliers and programming language to minimize the power consumption of the LinkIt engine. Additionally, the supported asynchronous communication is changed to synchronous communication that requires less power, which in turn minimizes the power consumption of the LOS. In addition, the LOS functional module can be subdivided into different APPs to enable single APP functions. Complemented by the APP in the BOS, different applications may share the same functional module, thereby achieving the purpose of saving power. In some embodiments, the APP that runs on the LOS can be further divided into a Type I APP and a Type II APP, wherein the TYPE I APP can provide the service interface that corresponds to the shared functional module (such as sensor); and the Type II APP acquires the services provided by the shared functional module through the service interface provided by the Type I APP. For example, in some embodiments, the APP that runs on the LOS can be further divided into two types: The first type of APP is called the service provider. This type of APP can register the service interface on the LinkIt engine. Through the LinkIt engine, services are provided to other APP; the second type of APP is called the service requester. This type of APP can acquire the above service interface through the LinkIt engine and enjoy the services. In this embodiment, a more typical application is to make one sensor drive into the first type of APP so that a number of APPs can have access to the services provided by the sensor. FIG. 7 is a schematic diagram illustrating an embodiment of two applications loaded in the LOS according to the invention. As shown in FIG. 7, it includes the service provider APP0 710, APP1 730, APP2 720, and LinkIt engine 740. The two APPs above are targeted in FIG. 7 (the first type of APP may be the service provider APP0 shown in FIG. 7; the second type of APP may be APP1 and APP2 shown in FIG. 7).

For example: in general, if two applications on a device show the user's heart rate, each application must have its own driver code on the test sensor to be able to obtain heart-rate sensor data and display the heart rate. According to the embodiment of the invention, the analysis shows that there are two applications in the device that show the heart rate. Therefore, the heart rate test sensor driver is made into one independent APP, through which data is generated. This data can be accessed by the two applications. By doing so, there is no need for every application to have its own driver code on the test sensor, thereby achieving the purpose of saving power.

Thus, according to the embodiments of the invention, two or more operating system structures may be set up on the same hardware device such as a processor to provide multiple operation modes and the operation mode can be adjusted to choose to enter the most favorable operation mode with low power consumption depending on the system status of the device. One of the beneficial effects is that, through the operating system and the dynamic switching of modes, the goals of lowering costs and reducing power consumption by devices can be achieved. In addition, the embodiments of the invention can write different APPs based on the features of the different operating systems, and different applications can be operated through different operating systems. The functional module can be divided further into applications under the low-power consumption profile, in which different applications can share the same functional module, enable low-power applications to save more power, and save storage space, thus achieving the purpose of saving power.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A device, comprising:
a storage unit; and
a processing unit including a processor and coupled to the storage unit, wherein the processing unit operates a big operating system (BOS) and a little operating system (LOS) and can dynamically switch between the BOS and the LOS according to a system loading status of the device, wherein the step of dynamically switching includes communicating between the BOS and the LOS which comprises a static communication mechanism and a dynamic communication mechanism, wherein in the static communication mechanism, variables or arrays are defined with a same name in both the BOS operating in a normal mode and the LOS operating in a suspend mode or a hibernation mode, and in the dynamic communication mechanism, the BOS operating in the normal mode and the LOS operating in the suspend mode or the hibernation mode use a same identifier (ID) of variables for performing data transmission between the BOS and the LOS, wherein power consumption and resource requirements of the BOS are different from those of the LOS.

2. The device of claim 1, wherein the BOS is operable in the normal mode and the LOS is operable in the suspend mode, the hibernation mode, or a deep hibernation mode, wherein the normal mode belongs to a non-power-saving mode and the suspend mode, the hibernation mode, and the deep hibernation mode are three different power-saving modes.

3. The device of claim 1, wherein the storage unit further comprises a random access memory (RAM) and a read-only memory (ROM), wherein when the device is operated in the suspend mode of the LOS, the power of the RAM is on and the power of the ROM is turned off.

4. The device of claim 3, wherein when the device is operated in the hibernation mode of the LOS, the power of the RAM and the power of the ROM are both turned off.

5. The device of claim 1, further comprising a clock generator, wherein when the device is operated in a deep hibernation mode of the LOS, and the device is being shut down and being booted up regularly by using the clock generator to periodically update time or detect at least one sensor.

6. The device of claim 3, wherein the ROM further comprises a first image file corresponding to the BOS and a second image file corresponding to the LOS, wherein the processor separately loads the first image file or the second image file into the RAM to dynamically switch between the BOS and the LOS, respectively.

7. The device of claim 1, wherein the processor further determines whether the device has applications locked in the suspend mode, the hibernation mode and/or a deep hibernation mode when operating in the LOS to determine whether the LOS operates in the suspend mode, the hibernation mode or the deep hibernation mode.

8. The device of claim 1, wherein when the device is operated under the suspend mode, the hibernation mode or a deep hibernation mode of the LOS, the processor further switches the operation mode to the normal mode of the BOS to continue the operation when detecting that the system loading of the device has increased to exceed a threshold value.

9. The device of claim 1, wherein the device is operated in the LOS when performing only simple calculations, time updating or sensor detection.

10. A method for switching between multiple operating systems in a device, wherein the device is operable in a big operating system (BOS) and a little operating system (LOS) and power consumption and resource requirements of the BOS are different from those of the LOS, the method comprising:

detecting system loading status of the device and dynamically switching between the BOS and the LOS according to the detected system loading status of the device, wherein the step of dynamically switching includes communicating between the BOS and the LOS which comprises a static communication mechanism and a dynamic communication mechanism, wherein in the static communication mechanism, variables or arrays are defined with a same name in both the BOS operating in a normal mode and the LOS operating in a suspend mode or a hibernation mode, and in the dynamic communication mechanism, the BOS operating in the normal mode and the LOS operating in the suspend mode or the hibernation mode use a same identifier (ID) of variables for performing data transmission between the BOS and the LOS.

11. The method of claim 10, wherein the BOS is operable in the normal mode and the LOS is operable in the suspend mode, the hibernation mode or a deep hibernation mode, wherein the normal mode belongs to a non-power-saving mode and the suspend mode, the hibernation mode, and the deep hibernation mode are three different power-saving modes.

12. The method of claim 10, wherein the device further comprises a Tightly Coupled Memory (TCM) and a random access memory (RAM), and the step of dynamically switching between the BOS and the LOS further comprise switching from the BOS to the suspend mode of the LOS to continue the operation, wherein the step of switching from the BOS to the suspend mode of the LOS to continue the operation further comprises:

running the BOS;
backing-up data in the TCM to an unused area in the RAM in the device;
decreasing phase-locked loop (PLL) frequency of the device;
decreasing operation voltage for the device;
loading an image file corresponding to the LOS to the TCM;
turning off the power of unused hardware devices within the device; and
switching the operation of the LOS to the suspend mode and operating in the suspend mode.

13. The method of claim 10, wherein the device further comprises a Tightly Coupled Memory (TCM) and a random access memory (RAM), and the step of dynamically switching between the BOS and the LOS further comprise switching from the suspend mode of the LOS to the BOS to continue the operation, wherein the step of switching from the suspend mode of the LOS to the BOS to continue the operation further comprises:

running the LOS;
increasing operation voltage for the device;
increasing PLL frequency of the device;
activating and initializing hardware devices that have previously been turned off in the device;
restoring TCM data backed up in the RAM to the TCM; and
switching the operation of the device to the normal mode of the BOS and operating in the normal mode.

14. The method of claim 10, wherein the device further comprises a Tightly Coupled Memory (TCM), and the step of dynamically switching between the BOS and the LOS further comprise switching from the BOS to the hibernation mode of the LOS to continue the operation, wherein the step of switching from the BOS to the hibernation mode of the LOS to continue the operation further comprises:

decreasing PLL frequency of the device;
decreasing operation voltage for the device;

loading an image file corresponding to the LOS to the TCM;

turning off the power of unused hardware devices; and switching the operation of the LOS to the hibernation mode and operate in the hibernation mode.

15. The method of claim 14, wherein the device further comprises the random access memory (RAM) and the read-only memory (ROM), and the step of switching from the BOS to the hibernation mode of the LOS to continue the operation further comprises:

backing-up memory data being used under the normal mode in the TCM and in the RAM of the to an unused area in the ROM of the device before the decreasing of the PLL frequency of the device.

16. The method of claim 10, wherein the device further comprises a Tightly Coupled Memory (TCM), a random access memory (RAM) and a read-only memory (ROM), and the step of dynamically switching between the BOS and the LOS further comprise switching from the hibernation mode of the LOS to the BOS to continue the operation, wherein the step of switching from the hibernation mode of the LOS to the BOS to continue the operation further comprises:

increasing operation voltage for the device;

increasing PLL frequency of the device;

activating and initializing hardware devices that have previously been turned off in the device;

restoring memory data being used under the normal mode in the TCM and in the RAM backed up in the ROM to the TCM and the RAM, respectively; and switching the operation of the device to the normal mode of the BOS and operating in the normal mode.

17. The method of claim 10, wherein the step of dynamically switching between the BOS and the LOS further comprises switching from the hibernation mode of the LOS to the BOS to continue the operation, wherein the step of switching from the hibernation mode of the LOS to the BOS to continue the operation further comprises:

increasing operation voltage for the device;

increasing PLL frequency of the device;

activating and initializing hardware devices that have previously been turned off in the device;

loading the BOS; and switching the operation of the device to the normal mode of the BOS and operating in the normal mode.

18. A communication method for communication between multiple operating systems in a device, wherein the device is operable in a big operating system (BOS) and a little operating system (LOS), and the BOS is operable in a normal mode and the LOS is operable in a suspend mode, a hibernation mode or a deep hibernation mode, the method comprising:

transferring a shared memory area from a random access memory (RAM) to a tightly coupled memory (TCM) before the operation of the device is switched from the normal mode the BOS to the suspend mode, the hibernation mode or the deep hibernation mode of the LOS; and transferring the shared memory area from the TCM to the RAM when the operation of the device is switched from the suspend mode, the hibernation mode or the deep hibernation mode of the LOS to the normal mode of the BOS, wherein the communication method further comprises a static communication mechanism and a dynamic communication mechanism, wherein in the static communication mechanism, variables or arrays are defined with a same name in both the BOS operating in the normal mode and the LOS operating in the suspend mode or the hibernation mode, and in the dynamic communication mechanism, the BOS operating in the normal mode and the LOS operating in the suspend mode or the hibernation mode use a same identifier (ID) of variables for performing data transmission between the BOS and the LOS.

19. The communication method of claim 18, further comprising:

setting an emergency timer and a non-emergency timer, wherein when the operation of the device is switched from the normal mode to the suspend mode, searching the emergency timer about to expire under the normal mode and recording the expiry time of the emergency timer found; and after the operation of the device is switched to the suspend mode, re-registering the emergency timer to the LOS.

20. The communication method of claim 18, further comprising:

starting all installed applications (APPs);

determining whether the starting is a cold start;

in response to determining that the starting is a cold start, sending a first message to the APP to enable the APP to select to load APPs of the LOS to the shared memory; and in response to determining that the starting is not a cold start, sending a second message to the APP to enable the APP to re-establish contact between the APP and the APPs of the LOS after receiving the second message.

21. An application management method applied to a device, wherein the device is operable in at least one big operating system (BOS) and one little operating system (LOS), and is applicable to perform a plurality of applications, the method comprising:

dividing the plurality of applications into applications operating on the BOS and applications operating on the LOS;

dividing the applications operating on the LOS into a first type of applications and a second type of applications, wherein the first type of applications provide a service interface that corresponds to a functional module and the second type of applications acquire services provided by the functional module through the service interface; and respectively performing the applications operating on the BOS and the applications operating on the LOS in the BOS and the LOS, wherein the applications operating on the BOS and the applications operating on the LOS are different.

22. The application management method of claim 21, wherein loading and releasing of the applications operating on the LOS are controlled by the application operating on the BOS.

23. The application management method of claim 21, wherein the applications operating on the BOS support asynchronous communication and the applications operating on the LOS only support synchronous communication.

* * * * *